United States Patent [19]

Beaver et al.

[11] Patent Number: 4,610,765
[45] Date of Patent: Sep. 9, 1986

[54] SEAL MEANS FOR ELECTROLYTIC CELLS

[75] Inventors: Richard N. Beaver, Angleton; Hiep D. Dang; H. Gene Newton, both of Lake Jackson, all of Tex.

[73] Assignee: The Dow Chemical Company, Midland, Mich.

[21] Appl. No.: 653,257

[22] Filed: Sep. 24, 1984

[51] Int. Cl.[4] .......................... C25B 1/26; C25B 9/00; C25B 13/02
[52] U.S. Cl. .................................... 204/128; 204/254; 204/279; 204/266
[58] Field of Search ........................ 204/279, 252–254, 204/255–256, 257–258, 128, 263–266

[56] References Cited

U.S. PATENT DOCUMENTS

| 3,378,480 | 4/1968 | Reinshagen et al. | 204/253 |
| 3,857,773 | 12/1974 | DuBois et al. | 204/242 |
| 4,013,535 | 3/1977 | White | 204/128 |
| 4,026,782 | 5/1977 | Bouy et al. | 204/254 |
| 4,098,670 | 7/1978 | Custer et al. | 204/252 |
| 4,137,144 | 1/1979 | Kenney | 204/268 |
| 4,175,025 | 11/1979 | Creamer et al. | 204/279 X |
| 4,207,165 | 6/1980 | Mose et al. | 204/279 X |
| 4,313,812 | 2/1982 | Kircher | 204/253 |
| 4,332,661 | 6/1982 | Ford et al. | 204/253 |
| 4,342,460 | 8/1982 | Eng | 204/279 X |
| 4,344,633 | 8/1982 | Niksa | 277/228 |
| 4,368,109 | 1/1983 | Ford | 204/279 X |
| 4,381,984 | 5/1983 | Kircher | 204/258 |
| 4,431,502 | 2/1984 | Ford | 204/279 X |
| 4,470,608 | 9/1984 | Warren | 277/164 |
| 4,490,231 | 12/1984 | Boulton | 204/263 |
| 4,493,759 | 1/1985 | Boulton et al. | 204/252 |

FOREIGN PATENT DOCUMENTS

| 0080288 | 11/1982 | European Pat. Off. . |
| 0118973 | 1/1984 | European Pat. Off. . |
| 53-63284 | 6/1978 | Japan . |
| 1078129 | 12/1964 | United Kingdom . |
| 1082867 | 3/1984 | U.S.S.R. . |

Primary Examiner—Donald R. Valentine
Attorney, Agent, or Firm—Joe R. Prieto

[57] ABSTRACT

A bipolar electrolytic cell assembly of the filter press-type comprising a first frame member, a second frame member, a separator interposed between the first and second frames to space apart an anode and cathode and a pre-compressed seal means interposed between at least the first or second frame member and the separator.

28 Claims, 2 Drawing Figures

SEAL MEANS FOR ELECTROLYTIC CELLS

BACKGROUND OF THE INVENTION

This invention relates to a seal means for electrolytic cells and a method of sealing electrolytic cells.

Electrolytic cells employing a separator and particularly cells used for the production of chlorine and alkali metal hydroxides by the electrolysis of aqueous solutions of alkali metal chlorides are generally of two types, the diaphragm-type and the membrane-type.

Generally, the membrane-type cell employs a sheet-like membrane of ion exchange material, such as those marketed by E. I. duPont de Nemours and Company under the trademark Nafion ® and by Asahi Glass Company, Ltd. under the trademark Flemion ®. Such cells are commonly of the flat plate or filter press-type having monopolar or bipolar electrode structures. U.S. Pat. Nos. 4,108,742 and 4,111,779 issued to Seko et al. illustrate the bipolar system electrolytic cell. Illustrative of another design is taught by Kenny in U.S. Pat. No. 4,137,144 and the patent references cited therein.

In the filter press membrane-type cell, it is typical to clamp or otherwise compress the membrane in sheet form between the sides of the frame members. In addition, it has been common practice to interpose a gasket between one of the frame members and the surface of the membrane to form a fluid-tight, i.e., liquid- and gas-tight, seal upon compression of the frames and gaskets, and prevent leakage of electrolyte from one cell compartment to another or the environment. This compression typically is applied manually or mechanically utilizing hydraulic rams or other types of pressure-applying apparatus to compress the electrode frames and the separating gaskets together. Obtaining a fluid-tight seal, however, is desirably done without damaging the membrane.

The gasket material normally employed between the membrane and an electrode frame member of an electrolytic cell is of a resilient material, such as rubber or an elastomer. Commercial bipolar membrane electrolyzers generally use ethylene-propylene (EPM) or ethylene-propylene-diene (EPDM) as gasket material between the membrane and electrode frames. However, the above materials tend to deform and expand outwardly as pressure is applied to the frames via the frame members. As the gaskets deform outwardly, certain separators which are in contact with the gaskets tend to stretch when they are pulled under the pressure of the outwardly deforming gaskets. This stretching of the separator or membrane beneath the gaskets employed on adjacent electrode frames can cause the membranes to break or tear when attempting to compress the frames into a fluid-tight cell. Furthermore, resilient gaskets require a higher compressive force to effect a seal which increases the risk of breaking or tearing the membrane.

Any tears or breaks in the membranes may reduce current efficiency during operation, greatly increasing electrical current usage while reducing the electrolytic operating efficiency of the cell. Too great a drop in current efficiency and/or electrolytic operating efficiency can require costly shutdown of the entire cell while the damaged membrane or membranes are replaced.

Custom made gaskets, flat sheets or O-ring EPDM gaskets, are usually made and installed in cells to minimize the damage to the membrane. However, these resilient gaskets will still substantially recover their size and shape after release of a compressive stress applied to them. Thus, a resilient gasket cannot be pre-compressed and the membrane must be installed with the gasket between the cell frames before compression. This increases the likelihood that the membrane will be damaged when being compressed with the resilient gasket.

In view of the foregoing problems, it is desired to provide a seal means for electrolytic cells and a method for sealing the cells with such a seal means without damaging the membrane of the cell.

SUMMARY OF THE INVENTION

The present invention is an electrolytic cell assembly comprising a first frame member, a second frame member, a separator interposed between the first and second frame member to space apart an anode and a cathode, and a pre-compressed seal means interposed between at least the first or second frame member and the separator. The seal means may be a gasket of fluorocarbon polymer material.

The present invention also involves a method of sealing an electrolytic cell comprising (a) interposing a pre-compressed seal means between at least a first frame member or a second frame member and a separator spacing apart an anode and a cathode in compartments defined by the first and the second frame members and the separator and (b) compressing the pre-compressed seal means, separator and the first and second frame members.

DETAILED DESCRIPTION OF PREFERRED EMBODIMENTS

Figure 1:
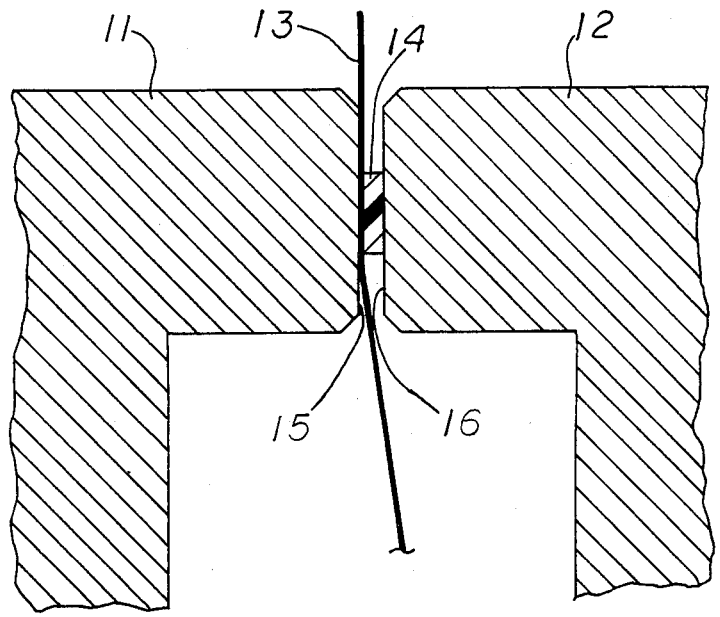
FIG. 1 is a cross-sectional view of an electrolytic cell assembly showing a pre-compressed gasket sealing means interposed between an electrode frame and separator.

Referring to FIG. 1, there is shown a filter press-type electrolytic cell assembly having a pair of adjacent filter press-type frame members 11 and 12. In this case, for illustration only, first frame member 11 is an anode frame member and second frame member 12 is a cathode frame member. Typically, the anode frame member and the cathode frame member is a single frame structure wherein an anode and a cathode are attached on opposite faces or sides of the structure and electrically connected through the structure. This cell assembly is typical of a filter press-type electrolytic cell unit which may be monopolar or bipolar. Herein the invention will be described with reference to a bipolar electrode-type, filter press-type electrolytic cell. Between the anode frame member 11 and cathode frame member 12 there is interposed a separator 13 and a pre-compressed seal means 14. The pre-compressed seal means 14 may be interposed between the separator and either one of the frames members 11 or 12. Furthermore, although only one pre-compressed seal means 14 is shown, this invention encompasses the use of pre-compressed seal means on both sides of separator 13.

By "pre-compressed seal means" it is meant a seal means which has undergone deformation by a squeeze force or compression and the seal means remains in a substantially compressed state or permanently deformed, prior to its end use. By "permanently deformed seal means" it is meant that a seal means is compressed to a desired thickness and remains compressed at such thickness without substantial change until its end use, i.e., installation between cell frame members 11 and 12, or until further compression. The "pre-compressed" feature of the seal means of the present invention is an advantage over the prior art seal means because by pre-compressing the seal means, the seal means undergoes the major compressive forces required to deform the seal means in absence of a separator which might be damaged by the major compressive forces.

Referring to FIG. 1 again, the cell frame members 11 and 12 contain a peripheral lateral surface or face 15 and 16, respectively. The seal means 14 is shown between the separator 13 and cathode frame member 12. The separator 13 is usually larger in size than the cell frame members 11 and 12 and preferably, extends beyond frame members 11 and 12, while the seal means 14 is generally confined to within the lateral face 15 of the anode frame member 11 or, as shown in FIG. 1, within the lateral face 16 of the cathode frame member 12. The separator 13 is shown bent at a slight angle away from lateral face 15 only to illustrate the lateral face 15 more clearly. The separator, typically, contacts the lateral face 15 completely. The seal means 14 may line the entire lateral face 15 or 16 of the anode or cathode frame members 11 and 12, respectively. Furthermore, a liner (not shown) on lateral face 15 or 16 can be used to protect the frame structure from corrosive environments. For example, the cell frame member 11 may contain a liner made of metal such as titanium or made of plastic such as polytetrafluoroethylene adjacent lateral face 15.

The frame members 11 and 12 may be any shape used in typical electrolytic cells, for example, in the shape of rectangular bars, C or U channels, cylindrical tubes, elliptical tubes as well as being I-shaped or H-shaped. Preferably, the cross-sectional shape of one electrode frame member unit containing frame members 11 and 12 is I-shaped.

The frame members 11 and 12 may be constructed of any material resistant to corrosion by the electrolytes and the products of electrolysis. For example, the anode frame member which is in contact with anolyte solution contained in the anode compartment may be made of metals such as iron, steel, stainless steel, nickel, titanium, or alloys of these metals. The cathode frame member which is in contact with a catholyte solution contained in the cathode compartment may be made of iron, steel, stainless steel, nickel, or alloys of these metals. Similarly, plastic materials such as polypropylene, polybutylene, polytetrafluoroethylene, fluorinated ethylene propylene, and chlorendic acid based polyesters can be employed for the anode and cathode frame members.

The separator 13 of the present invention may be a hydraulically permeable or impermeable separator. Preferably, inert flexible separators having ion exchange properties and which are substantially impervious to the hydrodynamic flow of the electrolyte and the passage of gas products produced during electrolysis are used. More preferably used are cation exchange membranes such as those composed of fluorocarbon polymers having a plurality of pendant sulfonic acid groups or carboxylic acid groups or mixtures of sulfonic acid groups and carboxylic acid groups. The terms "sulfonic acid groups" and "carboxylic acid groups" are meant to include salts of sulfonic acid or salts of carboxylic acid which are suitably converted to or from the acid group by processes such as hydrolysis. An example of a carboxylic acid type cation exchange membrane is commercially available from Asahi Glass Company under the trademark Flemion ®. Another example of a suitable membrane having cation exchange properties is a perfluorosulfonic acid membrane sold commercially by E. I. duPont de Nemours and Company under the trademark Nafion ®.

The seal means 14 of the present invention may be a gasket, and like the frames 11 and 12, the gaskets should be made of material which is corrosion-resistant to the electrolyte and the products of electrolysis. In the production of chlorine and caustic, for example, the gasket 14 must, of course, be substantially inert to acid, brine, chlorine, hydrogen and caustic as are present in the cell during normal operating conditions. The gasket 14 is also preferably non-conductive. The gasket 14 should be of a material having high volume resistivity and good sealability after it has been compressed. A main feature of this invention is that the material of gasket 14 be non-resilient or substantially permanently deformable. The gasket 14 is preferably made of a fluorocarbon polymer material and more preferably, of a polytetrafluoroethylene (PTFE). Preferably, a gasket made of a porous expanded PTFE material sold as GORE-TEX ® by W. L. Gore & Associates, Inc. Elkton, Md. is used. The gasket 14 of FIG. 1 may be attached to the lateral face 16 of frame member 12, prior to applying a compressive force to the cell assembly, by an adhesive such as cement or epoxy, known in the art. The cement or epoxy used should also be inert to the electrolysis environment.

Figure 2:
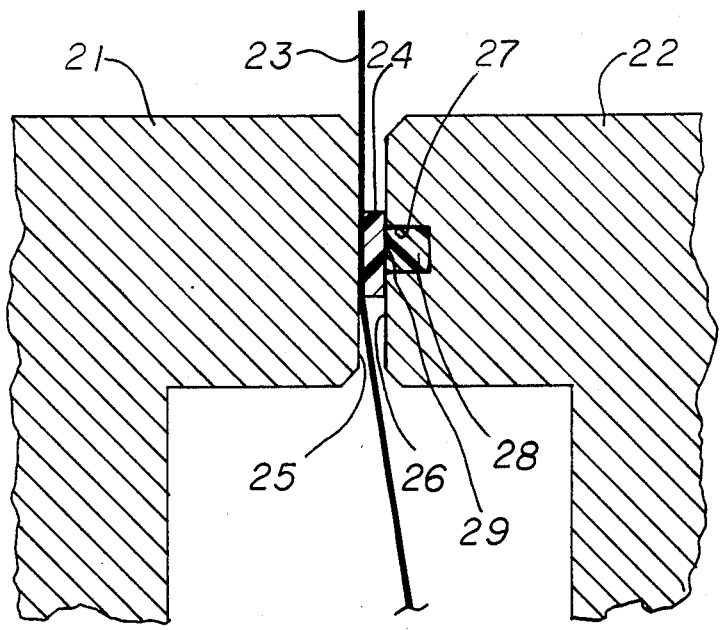
FIG. 2 is another embodiment of the present invention which is a cross-sectional view of an electrolytic cell assembly showing a pre-compressed gasket sealing means interposed between an electrode containing a recess and a separator.

An alternative embodiment of the present invention is shown in FIG. 2 which shows a membrane 23 and a pre-compressed, first gasket 24 interposed between an anode frame member 21 and a cathode frame member 22 with lateral face 25 and 26, respectively. The structure and materials of construction with respect to the membrane, the pre-compressed, first gasket and the electrode frame members of FIG. 2 are identical to those of FIG. 1 except that in FIG. 2, there is shown a recess 27 in the lateral face 26 of frame member 22. It is within the scope of this invention that either the lateral face 25 or 26, or both, of the cell frame members 21 and 22 can contain a recess or plurality of recesses. In addition, FIG. 2 shows a second gasket 28, either uncompressed or pre-compressed as first gasket 24, fitted into the recess 27. Second gasket 28 may be of identical material or of different material than first gasket 24. Although the gasket 14 of FIG. 1, the gaskets 24 and 28 of FIG. 2, and the recess 27 of FIG. 2 are illustrated somewhat conventionally as being generally rectangular in cross-section, various other suitable shapes may also be employed so as to obtain improved sealing effects. For example, the gaskets may be circular or toroidal in cross-section and the recess may be generally rectangular with its corners rounded. The recess may also be a generally semi-circular or a triangular groove viewed in cross-section or any other shape desired. Any well-known adhesive such as cement or epoxy material may be used at the interface 29 of gasket 28 and pre-compressed gasket 24 to hold the pre-compressed gasket 24 in place to the lateral face 26 of cathode frame 22 prior to applying a compressive force to the cell assembly. It is also within the scope of this invention that gaskets 24 and 28 be one piece.

In carrying out the method of the present invention, an uncompressed gasket is attached, preferably with an adhesive, to the lateral face of the cathode frame member or anode frame member of an electrolytic cell of the filter press-type. A sheet member, preferably having a thickness and flexible properties similar to a membrane to be employed in the electrolytic cell assembly, is then positioned between the cell's anode or cathode frame member and the gasket. Preferably, the sheet member may be of paper or plastic material and more preferably of kraft paper. Preferably, the thickness of the paper sheet is in the range of from about 0.005 inch to about 0.010 inch. A compressive force or load, which can be applied to the assembly by any known hydraulic form or clamping means, is applied to the cell assembly. After compressing the gasket to a desired thickness, the paper sheet is removed from between the gasket and electrode frame member. At this point, the gasket is pre-compressed and generally permanently deformed, i.e., release of the compressive force leaves the gasket in its compressed form.

Generally, a compressive load of from 10 percent to about 100 percent of the final compressive load required to obtain a desired electrolytic cell brine gap or a final desired gasket thickness is used to pre-compress the gasket. For example, the gasket may be compressed to a thickness of about 0.08 to about 0.015 inch using a compressive load of from about 400 to about 2,500 pounds per square inch (psi). After removing the paper sheet from between the gasket and electrode frame member, a membrane is substituted for the paper sheet. The cell frame member, the membrane and pre-compressed gasket are then compressed to provide a complete liquid- and gas-tight electrolytic cell assembly. Since the gasket is already in a compressed form, stresses caused to the membrane due to gasket deformation are negligible and, thus, damage to the membrane is minimized.

The following examples are provided to illustrate the invention only and not to be limited thereby. The examples describe use of a pre-compressed gasket in filter press-type electrolytic cells employing a membrane.

EXAMPLE 1

A pair of two feet by two feet dummy flat plate-type cell frames were used to test a gasket of GORE-TEX ® material. A ½ inch wide by 3/16 inch thick rope of GORE-TEX ® material was glued on a flat lateral face of one of the frames. The rope was lapped at its ends to provide a seal. No gasket was attached to the other frame. The two cell frames were installed on a two feet by two feet hydraulic squeezer. A sheet of kraft paper, approximately 0.010 inch thick, extending beyond the periphery of the cell frames was installed between the frames. The gasket between the frames was pre-compressed first to about 1/16 inch thick with about 200 psi on the gasket. The cell frames were then opened up and the kraft paper removed. A Nafion ® membrane No. 324 was then installed between the gasket and a cell frame. The cell frames with the membrane were then squeezed together again. Hot water at a temperature of from 85° C. to about 93° C. was circulated through the cell at about 5 to about 15 psig internal cell pressure. The squeezer hydraulic force was increased proportionally to the internal pressure in order to hold the gasket pressure constant around 350 psi. The test was run for about 140 hours. No leakage was observed. The cells were then shut down and opened up for inspection. The membrane showed no sticking and no thinning on gasket area.

COMPARATIVE EXAMPLE A

A pair of four inch by four inch dummy flat plate-type cell frames were used to test an uncompressed gasket of GORE-TEX ® material. A ⅜ inch wide by ⅛ inch thick rope of GORE-TEX ® material was glued on a flat lateral face of one of the frames. The rope was lapped at its ends to provide a seal. No gasket was attached to the other frame. A Nafion ® 324 membrane was installed between the frames. The two cell frames were squeezed between the platens of a hydraulic squeezer. Hot water at a temperature of 90° C. was circulated through the cell at 5 to 30 psig. The hydraulic force was increased proportionally to the internal pressure to hold the gasket pressure at 500 to 600 psi to stop leakage.

The test was run for 48 hours. The cell frames were then opened up and the gasket and membrane were inspected. It was observed that the area of the membrane under gasket pressure was stretched out and thinned.

EXAMPLE 2

An electrolyzer consisting of four rectangular flat plate-type cell frames (4 feet by 8 feet) was gasketed as follows: A ¼ inch diameter rope of GORE-TEX ® material was glued inside a ¼ inch groove located on the cathode side of the cell frames. The rope was pressed down into the groove so that the top surface of the GORE-TEX ® material was flush to the cell frame lateral face. Then a ½ inch wide by 3/16 inch thick rope of GORE-TEX ® material was glued centered on the top of the ¼ inch diameter rope and extended around the entire cathode gasket face. The rope was lapped at its ends to provide a seal. No gasket was placed on the anode side of the cell frames.

A sheet of kraft paper, approximately 0.010 inch thick extending beyond the periphery of the cell frame was attached with masking tape to the anode side of each cell frame.

The gasketed cell frames with attached paper sheets were installed one at a time on a cell skid between the two platens of a hydraulic squeezer. The cell frames were then compressed together with about 1200 psi on the hydraulic cylinder (94,000 lbs force on the squeezer) which was equivalent to about 540 psi on the gasket. The ½ inch GORE-TEX ® rope was compressed from the initial ½ inch wide by 3/16 inch thick shape to a ⅝ inch wide by 1/16 thick gasket. The hydraulic pressure was then relieved. The cell frames were spread out and the paper sheets removed. A sheet of Nafion ® No. 324 membrane was then installed between adjacent cell frames. After installing the membranes, the cell frames were compressed again with approximately 1650 psi on the hydraulic cylinder.

Anolyte and catholyte were circulated through the cells and power was turned on to energize the electrolyzer. The cells were operated at a temperature of 90° C. and at an internal pressure ranging from 5 psig to 20 psig. The squeezer hydraulic cylinder pressure varied accordingly from 1650 psi up to 2200 psi to stop gasket leak. The gasket thickness varied from 0.050 inch to 0.030 inch. The average gasket pressure was held at about 500 psi.

During eight months of operation, the electrolyzer was shut down five times for cell modifications and membrane change outs. Used gaskets were taken off the cells during each shutdown and visually inspected. No damage was seen on the gaskets or on the membranes in the gasket area. New gaskets were installed on the cells according to the above procedure after each shutdown.

What is claimed is:

1. An electrolytic cell assembly comprising a first frame member, a second frame member, a separator interposed between the first and second frame members to space apart an anode and a cathode and a pre-compressed seal means interposed between at least the first or second frame member and the separator.

2. The cell assembly of claim 1 wherein the assembly is a filter press-type.

3. The cell assembly of claim 2 wherein the assembly is bipolar.

4. The cell assembly of claim 3 wherein the separator is a membrane.

5. The cell assembly of claim 4 wherein the seal means is a gasket.

6. The cell assembly of claim 5 wherein the gasket is made of a fluorocarbon polymer.

7. The cell assembly of claim 6 wherein the fluorocarbon polymer is a porous expanded polytetrafluoroethylene material.

8. The cell assembly of claim 7 wherein at least one of the frame members contains a recess therein.

9. The cell assembly of claim 8 wherein the recess contains a gasket therein.

10. The cell assembly of claim 9 wherein the first frame member is an anode electrode frame member and the second frame member is a cathode electrode frame member.

11. A method of sealing an electrolytic cell comprising (a) interposing a pre-compressed seal means between at least a first frame member or a second frame member and a separator spacing apart an anode and a cathode in compartments defined by the first and second frame members and the separator and (b) compressing the pre-compressed seal means, separator and the first and second frame members.

12. The method of claim 11 wherein the electrolytic cell is a filter press-type.

13. The method of claim 12 wherein the electrolytic cell is bipolar.

14. The method of claim 13 wherein the separator is a membrane.

15. The method of claim 14 wherein the seal means is a gasket.

16. The method of claim 15 wherein the gasket is made of a fluorocarbon polymer.

17. The method of claim 16 wherein the fluorocarbon polymer gasket is a porous expanded polytetrafluoroethylene.

18. A method of sealing an electrolytic cell comprising:
    (a) interposing a sheet member between at least a first and a second frame member,
    (b) interposing a permanently deformable seal means between at least the first or second frame member and the sheet member,
    (c) compressing the first and second frame members, sheet member, and seal means sufficient to permanently deform the seal means,
    (d) releasing the compressive force sufficient to remove the sheet member,
    (e) substituting a membrane for the sheet member, and
    (f) compressing the first and second frame members, seal means and membrane sufficient to form a liquid and gas tight seal.

19. The method of claim 18 wherein the sheet member is made of paper or plastic material.

20. The method of claim 19 wherein the seal means is permanently deformed to a thickness sufficient to provide a liquid and gas tight seal.

21. The method of claim 20 wherein the seal means is a gasket.

22. The method of claim 21 wherein the gasket is made of a fluorocarbon polymer.

23. The method of claim 22 wherein the fluorocarbon polymer gasket is a porous expanded polytetrafluoroethylene.

24. A method of electrolysis comprising:
    (a) feeding an aqueous alkali metal halide solution to an electrolytic cell having at least a first frame member, a second frame member, a separator interposed between the first and second frame members to space apart an anode and a cathode, and a pre-compressed seal means interposed between at least the first or second frame member and the separator, and
    (b) passing an electrical current from the anode to the cathode such that a halide is evolved at the anode.

25. The method of claim 24 wherein the aqueous alkali metal halide is sodium chloride.

26. The process of claim 25 wherein the seal means is a gasket.

27. The process of claim 26 wherein the gasket is made of a fluorocarbon polymer.

28. The process of claim 27 wherein the fluorocarbon polymer gasket is a porous expanded polytetrafluoroethylene.

* * * * *